United States Patent
Lazzara

(10) Patent No.: US 7,513,275 B2
(45) Date of Patent: Apr. 7, 2009

(54) REPAIR KIT FOR NATURAL GAS PIPE

(75) Inventor: Christopher J. Lazzara, Palm Beach Shores, FL (US)

(73) Assignee: Neptune Research, Inc., West Palm Beach, FL (US)

( * ) Notice: Subject to any disclaimer, the term of this patent is extended or adjusted under 35 U.S.C. 154(b) by 17 days.

(21) Appl. No.: 11/291,429

(22) Filed: Dec. 1, 2005

(65) Prior Publication Data

US 2007/0125437 A1    Jun. 7, 2007

(51) Int. Cl.
*F16L 55/18* (2006.01)

(52) U.S. Cl. .............................. 138/99; 138/97; 156/53; 156/49

(58) Field of Classification Search .................. 138/99, 138/97, 104; 40/316; 156/94, 48, 53, 54, 156/56, 187, 188, 195
See application file for complete search history.

(56) References Cited

U.S. PATENT DOCUMENTS

| | | | | |
|---|---|---|---|---|
| 3,388,016 A | | 6/1968 | Murray et al. | 156/94 |
| 3,531,345 A | | 9/1970 | Torosian | 156/94 |
| 3,772,113 A | * | 11/1973 | Patrick | 156/94 |
| 3,847,722 A | | 11/1974 | Kistner | 428/76 |
| 4,246,712 A | * | 1/1981 | Vander Wall | 40/316 |
| 4,427,002 A | * | 1/1984 | Baron et al. | 602/8 |
| 4,519,856 A | | 5/1985 | Lazzara | 156/94 |
| 4,552,183 A | | 11/1985 | Chick | 138/97 |
| 4,723,579 A | | 2/1988 | Hyodo et al. | 138/97 |
| 4,756,337 A | * | 7/1988 | Settineri | 138/99 |
| 4,774,937 A | | 10/1988 | Scholy et al. | 156/94 |
| 4,824,500 A | | 4/1989 | White et al. | 156/94 |
| 4,853,165 A | | 8/1989 | Rozenweig et al. | 264/36 |
| 4,968,542 A | | 11/1990 | Gasper et al. | 428/308.4 |
| 5,030,493 A | | 7/1991 | Rich | 428/63 |
| 5,311,688 A | * | 5/1994 | Aeschbacher et al. | 40/665 |
| 5,565,051 A | * | 10/1996 | Marzola et al. | 156/94 |
| 5,732,743 A | * | 3/1998 | Livesay | 138/99 |
| 5,894,864 A | * | 4/1999 | Rich | 138/99 |
| 6,276,401 B1 | * | 8/2001 | Wilson | 138/172 |
| 6,883,835 B2 | * | 4/2005 | Krout et al. | 285/15 |
| 6,901,967 B1 | | 6/2005 | Kuenzer | 138/99 |
| 2004/0234773 A1 | * | 11/2004 | Setiabudi | 428/413 |

* cited by examiner

*Primary Examiner*—Patrick F Brinson
(74) *Attorney, Agent, or Firm*—Nixon Peabody LLP

(57) ABSTRACT

A method and kit for repairing a gas leak in a pipe containing natural gas. The natural gas repair kit includes a leak sealant, a pressure sealant, and an encapsulator. The method for repairing the gas leak includes the act of applying a leak sealant over the leak in the pipe. The method further includes the act of wrapping a pressure sealant around the pipe near the leak. The pressure sealant should enclose and contact the leak sealant. Additionally, an encapsulator should be wrapped around the pipe near the leak. The encapsulator should contact the pressure sealant and the pipe.

22 Claims, 11 Drawing Sheets

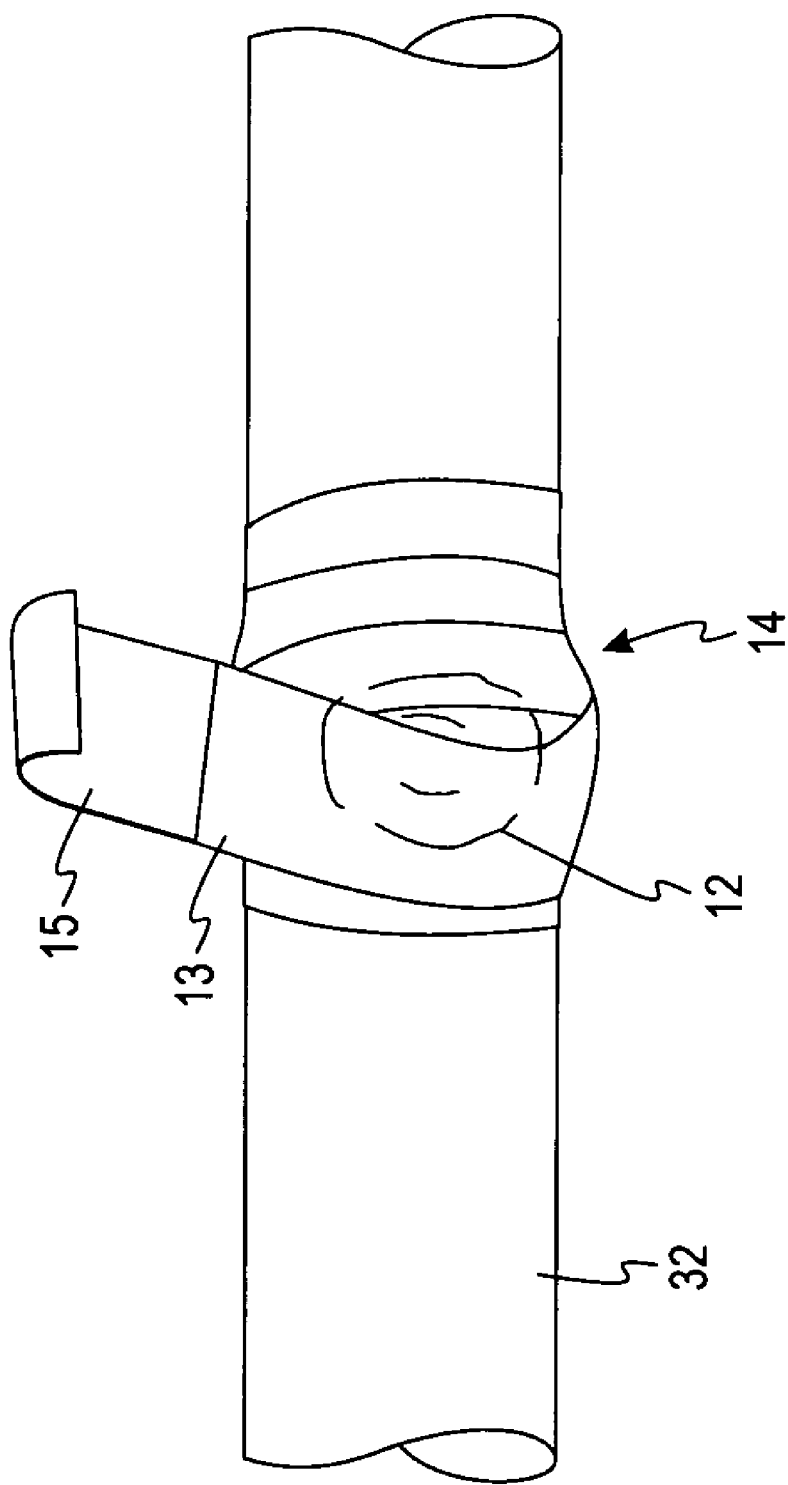

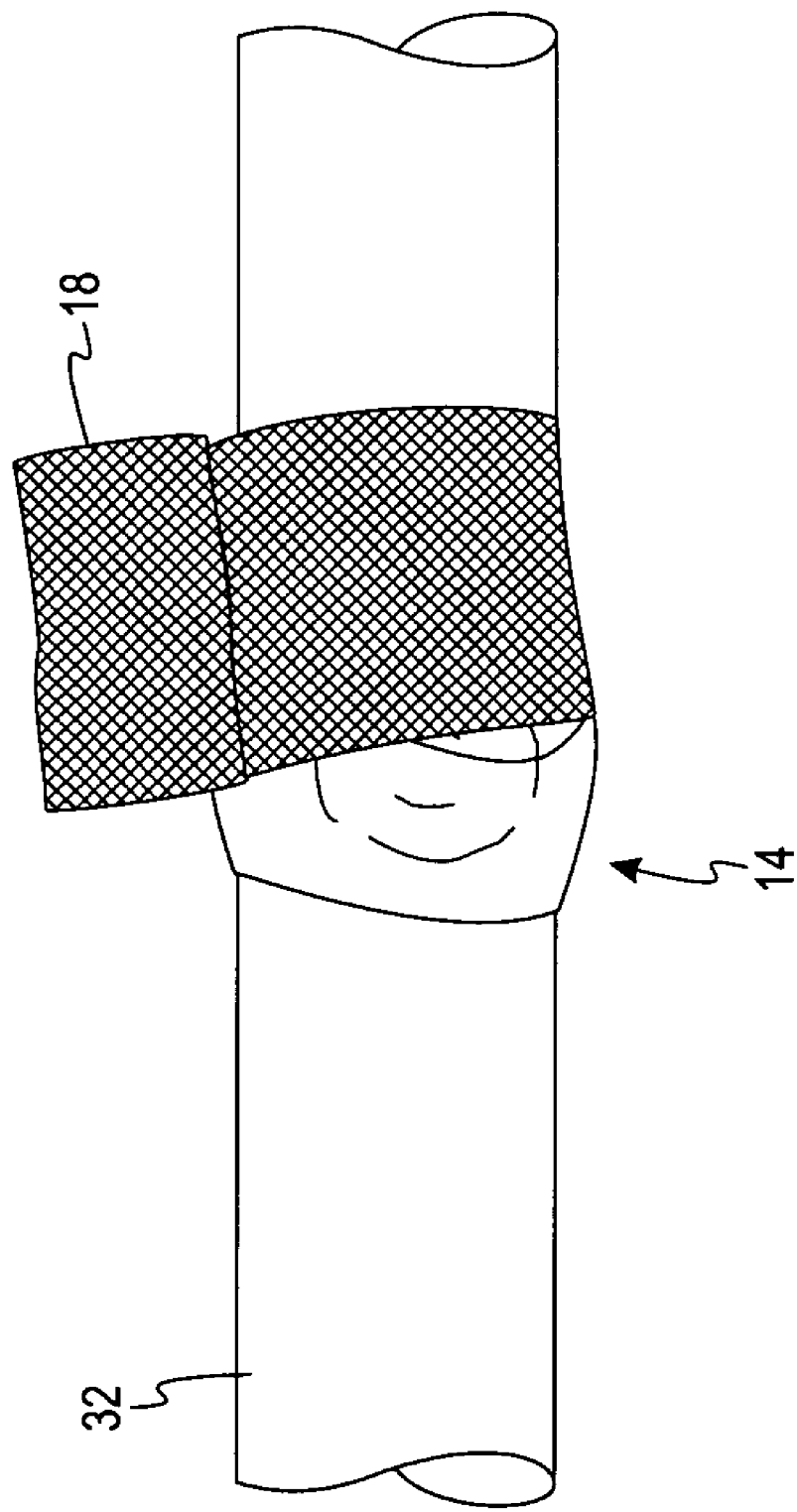

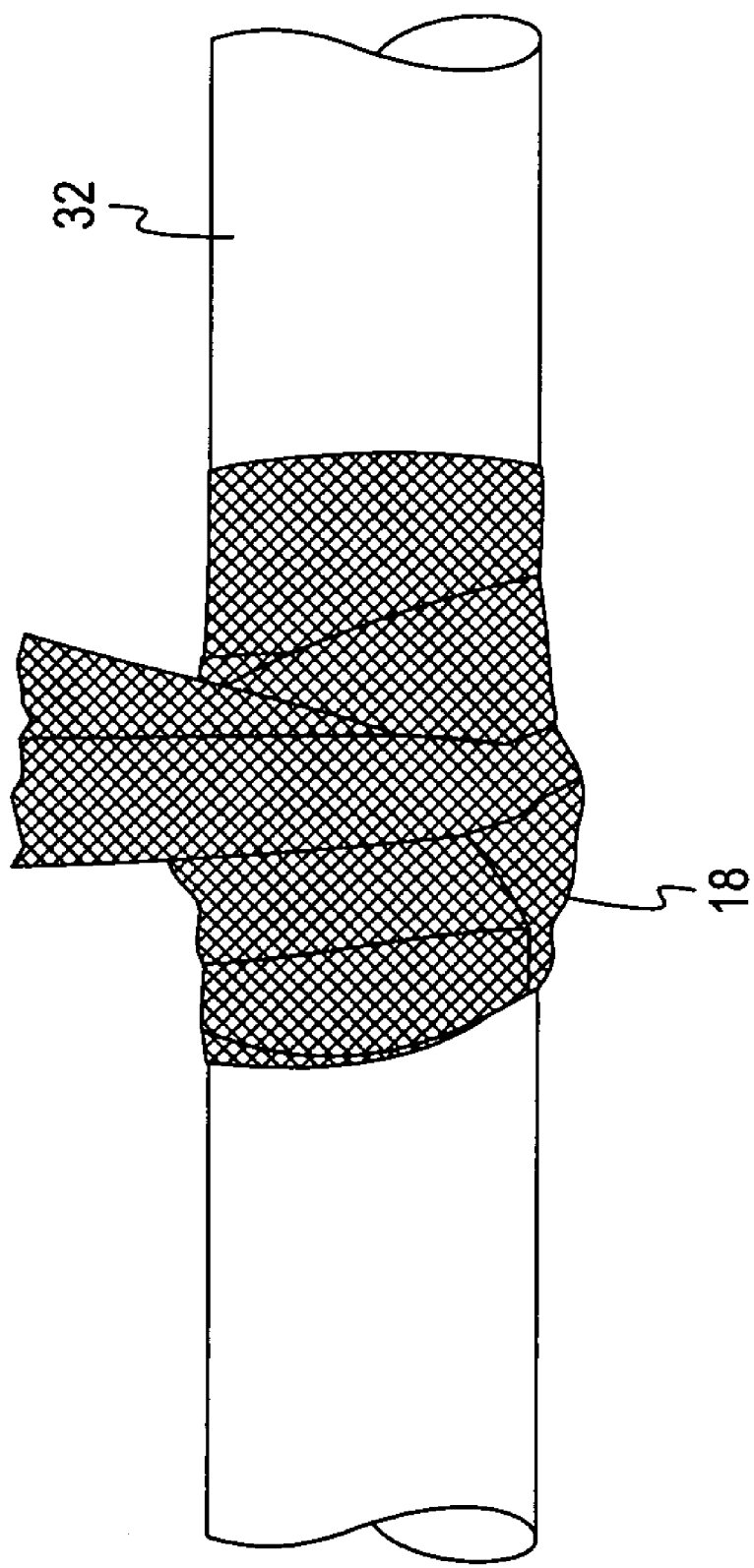

REPAIR KIT FOR NATURAL GAS PIPE

FIELD OF THE INVENTION

The present invention relates generally to the repair of leaks in natural gas pipes.

BACKGROUND OF THE INVENTION

Natural gas is combustible and lighter than air. If left unchecked, it will displace oxygen. Unrepaired leaks increase health and environmental risks for employees and the public population.

There are various systems available for patching pipes once a leak is detected and located. For example, external clamps are often times used to repair leaks. However, the installation of external clamps can be quite an intricate process. Various internal repair methods have also been used. A split sleeve spot repair system, such as Link-Pipe™, is an example of an internal repair product. Link-Pipe™ pipe repair system involves covering the damaged area with an internally applied prefabricated stainless steel sleeve. More information can be found regarding Link-Pipe™ through Link-Pipe, Inc. at www.linkpipe.com.

Furthermore, in the repair of natural gas lines, there is a need to effect the repairs in as short a time period as possible. Thus, there is a need for a pipe repair system that is quick, versatile, faster, cheaper and uses a more convenient repair method than is possible with current methods.

SUMMARY OF INVENTION

A natural gas repair kit according to one embodiment of the present invention is adapted to repair a leak in a pipe containing natural gas. The natural gas repair kit comprises a deformable leak sealant, a pressure sealant, and an encapsulator. The deformable leak sealant is adapted to cover the leak in the natural gas pipe. The pressure sealant is adapted to surround and contact the leak sealant thereby causing the leak sealant to conform to the leak. The encapsulator is adapted to surround the leak sealant and pressure sealant. The encapsulator also contacts the pressure sealant and a portion of the natural gas pipe adjacent to the leak.

The present invention also involves a method for repairing a gas leak in a pipe containing natural gas. The method for repairing the gas leak includes the act of applying a deformable leak sealant over the leak in the pipe. The pressure sealant is wrapped around the pipe near the leak. The pressure sealant causes the deformable leak sealant to better conform to the leak. The method also includes the act of wrapping an encapsulator around the pipe near the leak. The encapsulator contacts the pressure sealant and the pipe.

Alternatively, the present invention is a method for repairing a gas leak in a pipe containing natural gas. The method for repairing the gas leak includes the act of locating the origin of the leak. The method further includes the act of cleaning and roughening a surface of the pipe surrounding the gas leak. The deformable leak sealant should be placed over the gas leak, covering the leak. Before the deformable leak sealant has hardened, the pressure sealant should be wrapped around the pipe near the leak. The pressure sealant should cause the deformable leak sealant to conform to the leak. The gas leak may be tested with a natural gas detection device to ensure that no natural gas is being released. Additionally, the encapsulator should be activated and wrapped around the pipe and the pressure sealant. An identification tag may be placed in the encapsulator. The identification tag contains information concerning the repair of the gas leak. The method further includes the act of applying pressure to the encapsulator to conform to the pipe and the pressure sealant.

The above summary of the present invention is not intended to represent each embodiment, or every aspect, of the present invention. Additional features and benefits of the present invention are apparent from the detailed description and figures set forth below.

BRIEF DESCRIPTION OF THE DRAWINGS

The foregoing and other advantages of the invention will become apparent upon reading the following detailed description and upon reference to the drawings.

FIG. 5a illustrates the application of the pressure sealant to the pinhole leak.

FIG. 6a illustrates the application of the encapsulator to the pinhole leak.

FIG. 6b illustrates the encapsulator being twisted while being applied.

Figure 1:
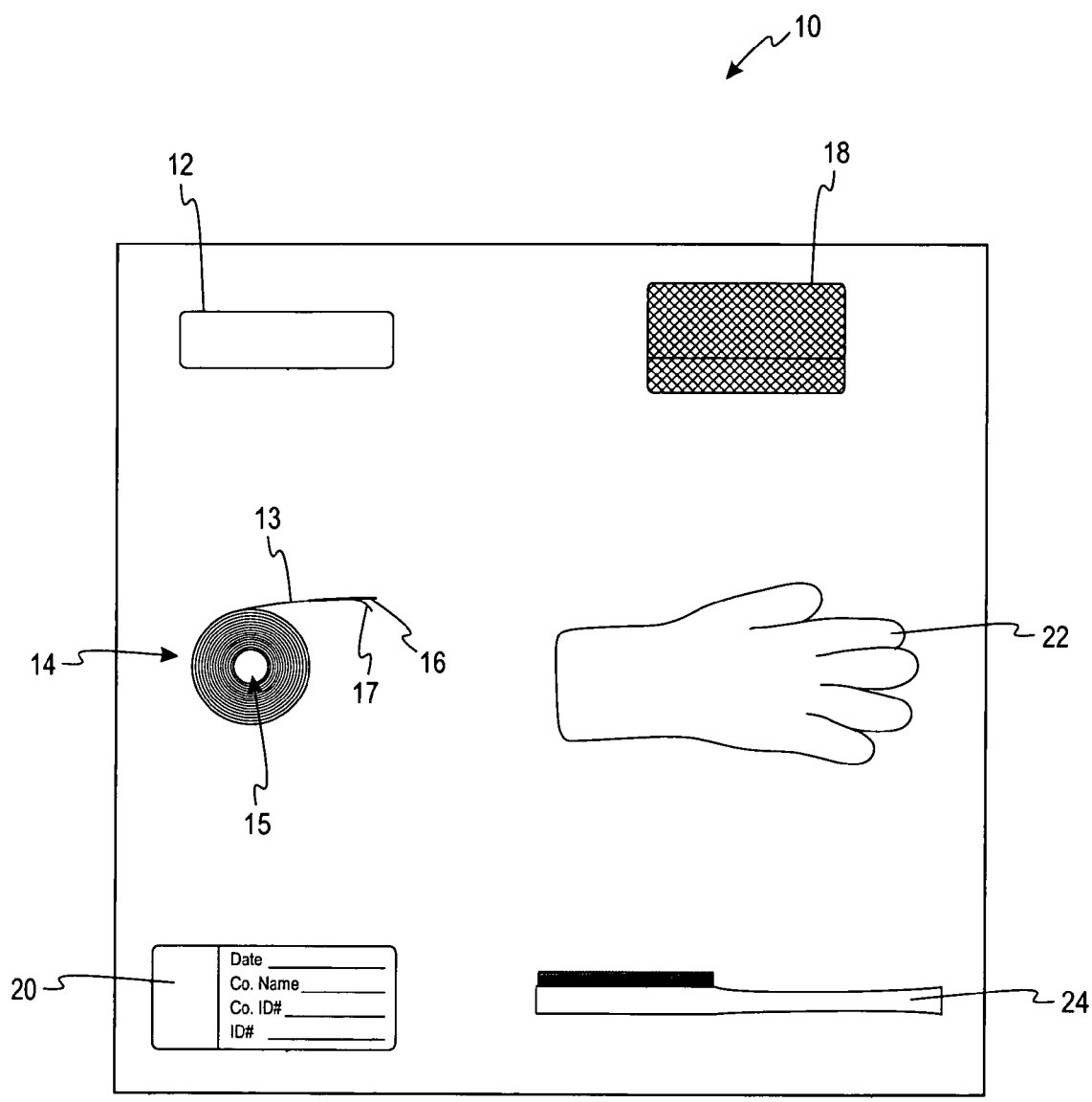
FIG. 1 illustrates a repair kit for a natural gas pipe leak.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a natural gas repair kit 10 is disclosed. The natural gas repair kit 10 includes a leak sealant 12. The leak sealant 12 is adapted to conform to pipe threads, such as those exposed at a pipe joint, or pipe holes, such as a pinhole leak. One material that may be used for the leak sealant 12 is a putty, such as Trident-Seal™ putty. The Trident-Seal™ putty is yellow steel-reinforced two-part epoxy. The maximum mixing time is 3 minutes, and the putty should be mixed at 50° F. or above. It is non-hazardous and hardens like steel. The Trident-Seal™ putty is composed of glycidyl ether of bisphenol A resins and tri (dimethylaminomethyl) phenol. Other possible materials that can be used for the leak sealant 12 include gas resistant epoxy putty and other gas resistant putty materials.

The natural gas repair kit 10 also contains a pressure sealant 14. The pressure sealant 14 is adapted to force the leak sealant 12 into a pinhole leak or a joint leak with increasing pressure. In one embodiment, the pressure sealant 14 is a tape, such as Trident-Seal™ rubber tape. The Trident-Seal™ rubber tape is composed of bis(t-butylperoxyisopropyl) benzene, carbon black, ethylene-propylene-50-ethylideneorbormene polymer, mineral oil, and zinc oxide. As shown in FIG. 1, the pressure sealant 14 includes a rubber portion 13, an additional adhesive 15 on a first end portion, and an additional adhesive 16 on a second end portion. The adhesives 15 and 16 are adapted to hold the pressure sealant 14 in place. The adhesives 15 and 16 may initially be covered by a protective paper 17 to ensure that the adhesives 15, 16 optimally retain their adhesive properties before use. The length of the pressure sealant 14 will vary depending on the diameter of the pipe containing a leak. Thus, the present invention contemplates different gas repair kits 10 made for different sized pipes.

Also included in the natural gas repair kit 10 is an encapsulator 18. The encapsulator 18 is adapted to maintain the leak sealant 12 and the pressure sealant 14 in position while protecting and securing the repair. The encapsulator 18 strengthens the damaged area mechanically and, preferably, creates a rock-hard shield. In one preferred embodiment, the encapsulator 18 is a cloth-like wrap that hardens after setting, such as a Trident-Seal™ Glass Outer Wrap.

The Trident-Seal™ Glass Outer Wrap is a high-strength patching material made of a cloth woven from continuous filament fiberglass wrap and filling yarns. It is impregnated between the yarns with a resinous pliable-plastic material which hardens spontaneously upon exposure to aqueous moisture. More information regarding this type of wrap is disclosed in U.S. Pat. No. 5,030,493, which is herein incorporated by reference in its entirety. The length of the encapsulator 18 will vary depending on the diameter of the pipe containing the leak.

The other components of the natural gas repair kit 10 shown in FIG. 1 include an identification card 20, disposable protective gloves 22, and pipe roughening material 24. The identification card 20 is adapted to receive various identifying information concerning the natural gas leak and the corresponding repair. The protective gloves 22 are adapted to be worn by a user in the preparation and application of any materials that may irritate the skin, which may be the case of the encapsulator 18 as will be discussed below. The protective gloves 22 are preferably composed of latex, but can be composed of any material that enables the protective gloves 22 to be used for their intended purpose. The pipe roughening material or materials 24 may be a wire brush, sandpaper, and/or any other material adapted to clean and roughen a pipe surface. The identification card 20, the protective gloves 22, and the pipe roughening material 24 are considered optional and not necessary components of the natural gas repair kit 10.

Figure 2:
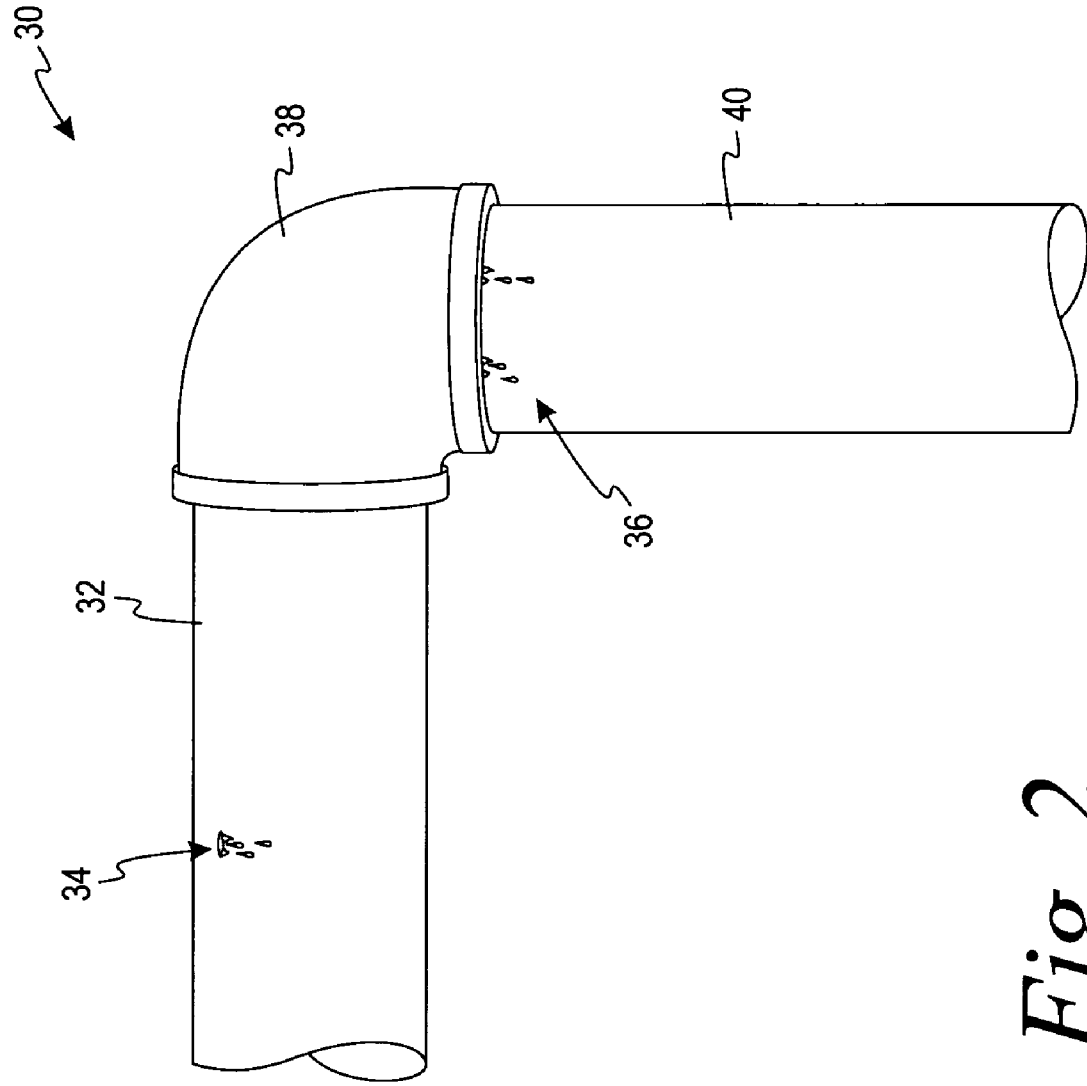
FIG. 2 illustrates a side view of a portion of a natural gas piping system containing a pinhole leak and a joint leak.

FIG. 2 illustrates a portion of a natural gas piping system 30, which includes a first pipe 32 and a second pipe 40. Natural gas piping systems are typically comprised of metal such as steel. The natural gas pressure within a natural gas piping system 30 such as the one illustrated in FIG. 2 is typically in the range from about 0.1 PSI to about 20 PSI. A pinhole leak 34 is in the first pipe 32 while a joint leak 36 is located between an elbow 38 and the second pipe 40. The natural gas repair kit 10 can be used to repair the pinhole leak 34 and the joint leak 36.

Figure 3:
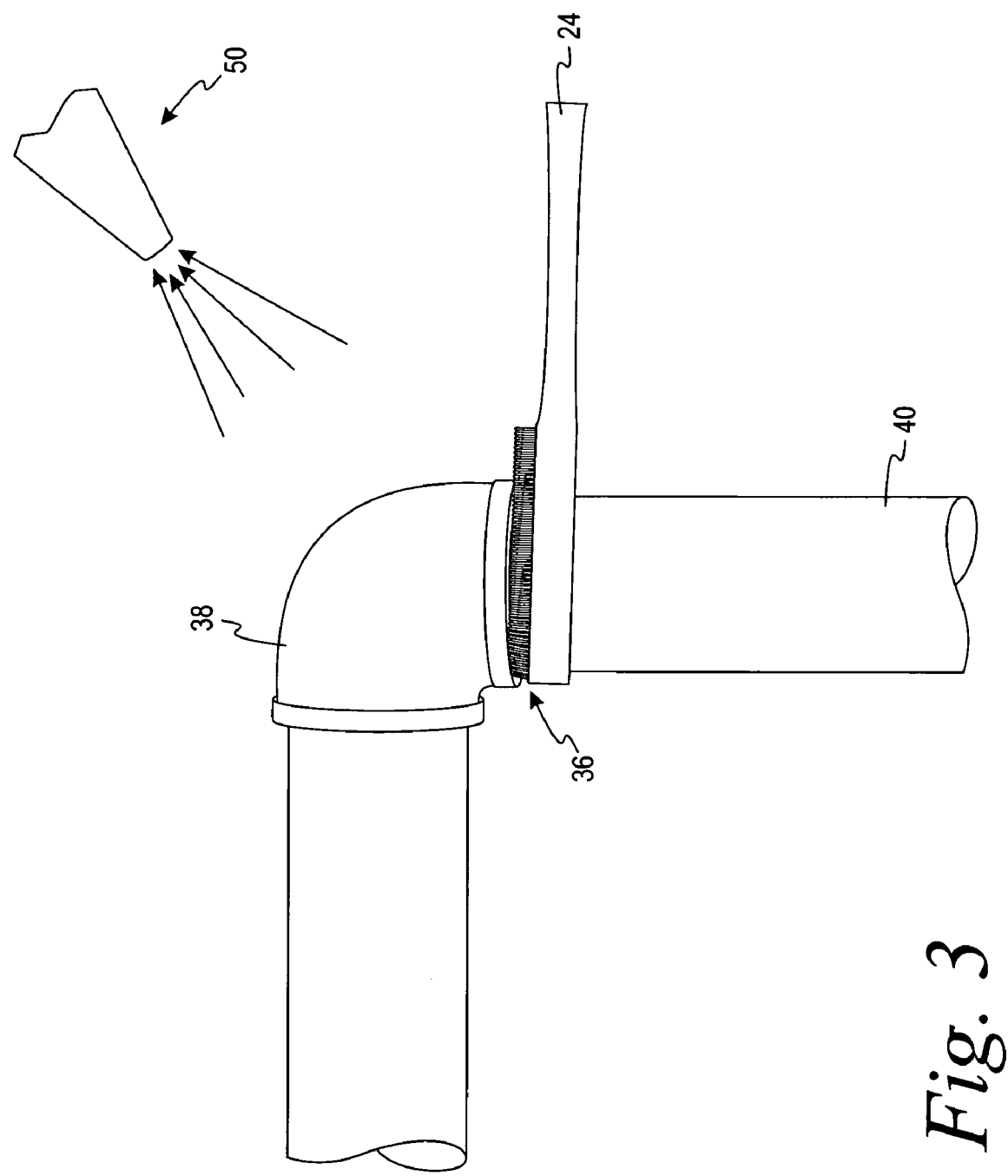
FIG. 3 illustrates a side view of the cleaning and roughening of a portion of the natural gas piping system as well as a standard leak detection device.

Referring now to FIG. 3, one embodiment of the pipe roughening material 24 is shown cleaning and roughening the surface of the pipe 40 and the elbow 38. The pipe roughening material 24 is used prior to repair of a pipe leak, such as the joint leak 36. The pipe roughening material 24 is used to remove dirt, loose scale, and any oil or grease from the surface of the pipe 40. Once the pipe 40 and the elbow 38 are clean and roughened, the origin of the leak (e.g., the joint leak 36) should be pinpointed following standard operating leak detection procedures. By way of illustration, a leak detection device 50 is shown in FIG. 3. If leak detection soap is used, the pipe surface should be wiped clean and any remaining soap should be removed before beginning the repair. While the above procedure was described in reference to the joint leak 36, the same procedure would be followed for any type of leak, such as the pinhole leak 34 in the pipe 32.

Figure 4A:
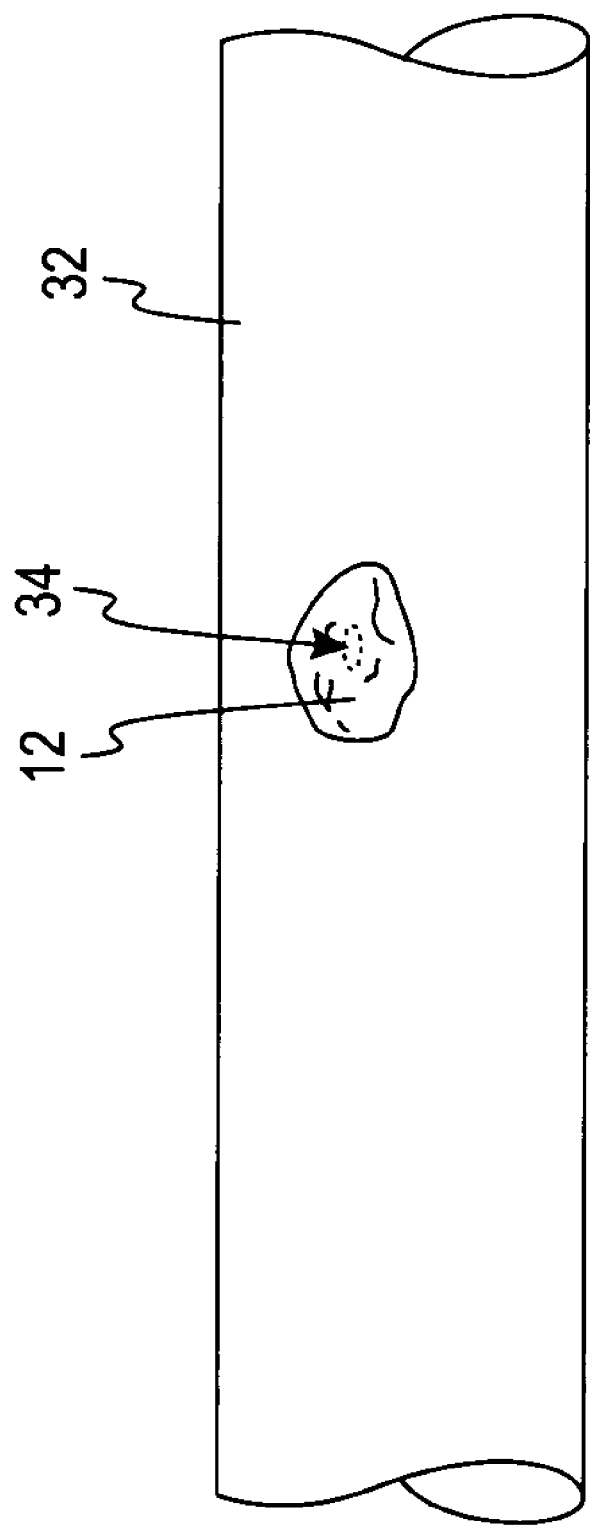
FIG. 4a illustrates the application of the leak sealant to the pinhole leak.
Figure 4B:
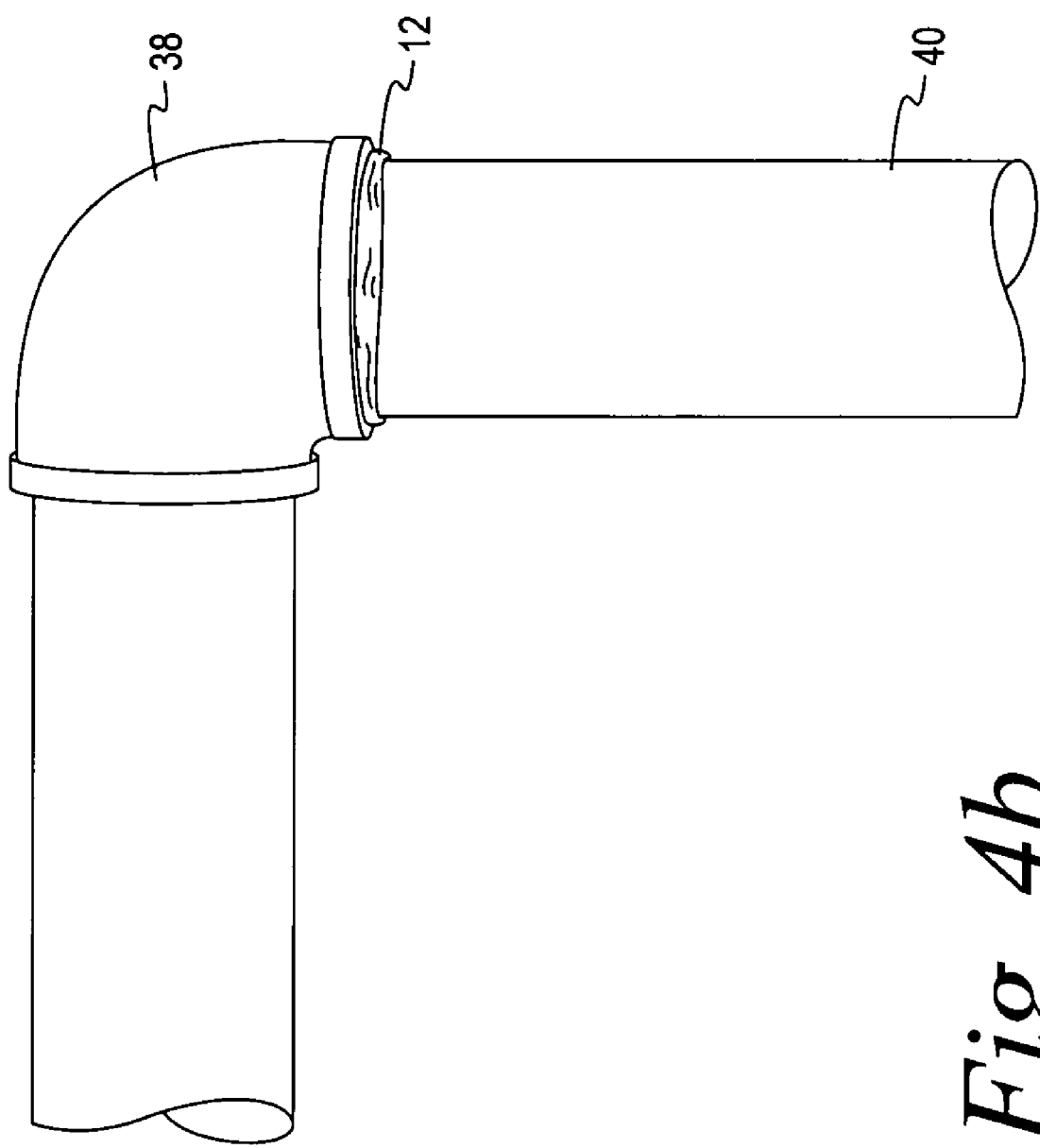
FIG. 4b illustrates the application of the leak sealant to the joint leak.

The leak sealant 12 is generally applied after the leak (e.g., pinhole leak 34 or joint leak 36) has been pinpointed and the surface of the pipe (e.g., pipe 32, pipe 40, or elbow 38) has been cleaned and roughened. However, prior to the application of the leak sealant 12, the leak sealant 12 should be blended or kneaded until it is uniformly mixed. The amount of the leak sealant 12 that is used should be such that the leak sealant 12 will adequately cover the leak (e.g., the pinhole leak 34 or the joint leak 36). However, an excessive amount of the leak sealant 12 should not be used as it may hinder repair. Furthermore, the leak sealant 12 should be formed into a shape that will adequately cover the particular shape of a leak (e.g., the pinhole leak 34 or the joint leak 36). If Trident-Seal™ putty is used, then the leak sealant 12 should not be worked more than 3 minutes before the application of the pressure sealant 14. FIGS. 4a and 4b show the leak sealant 12 being applied to the pinhole leak 34 and the joint leak 36 respectively. Referring initially to FIG. 4a, after the leak sealant 12 has been formed into a shape that will adequately cover the pinhole leak 34, it should be applied directly over the pinhole leak 34. The leak sealant 12 should be pressed firmly in place. Referring now to FIG. 4b with respect to covering the joint leak 36, the leak sealant 12 should be rolled into a rope long enough to encompass the entire joint between the elbow 38 and the pipe 40. Just enough of the leak sealant 12 should be used to make a smooth transition between the pipe 40 and the elbow 38. The leak sealant 12 should be pressed firmly in place. However, it should be noted that the setting time of the leak sealant 12 may be important.

Figure 5B:
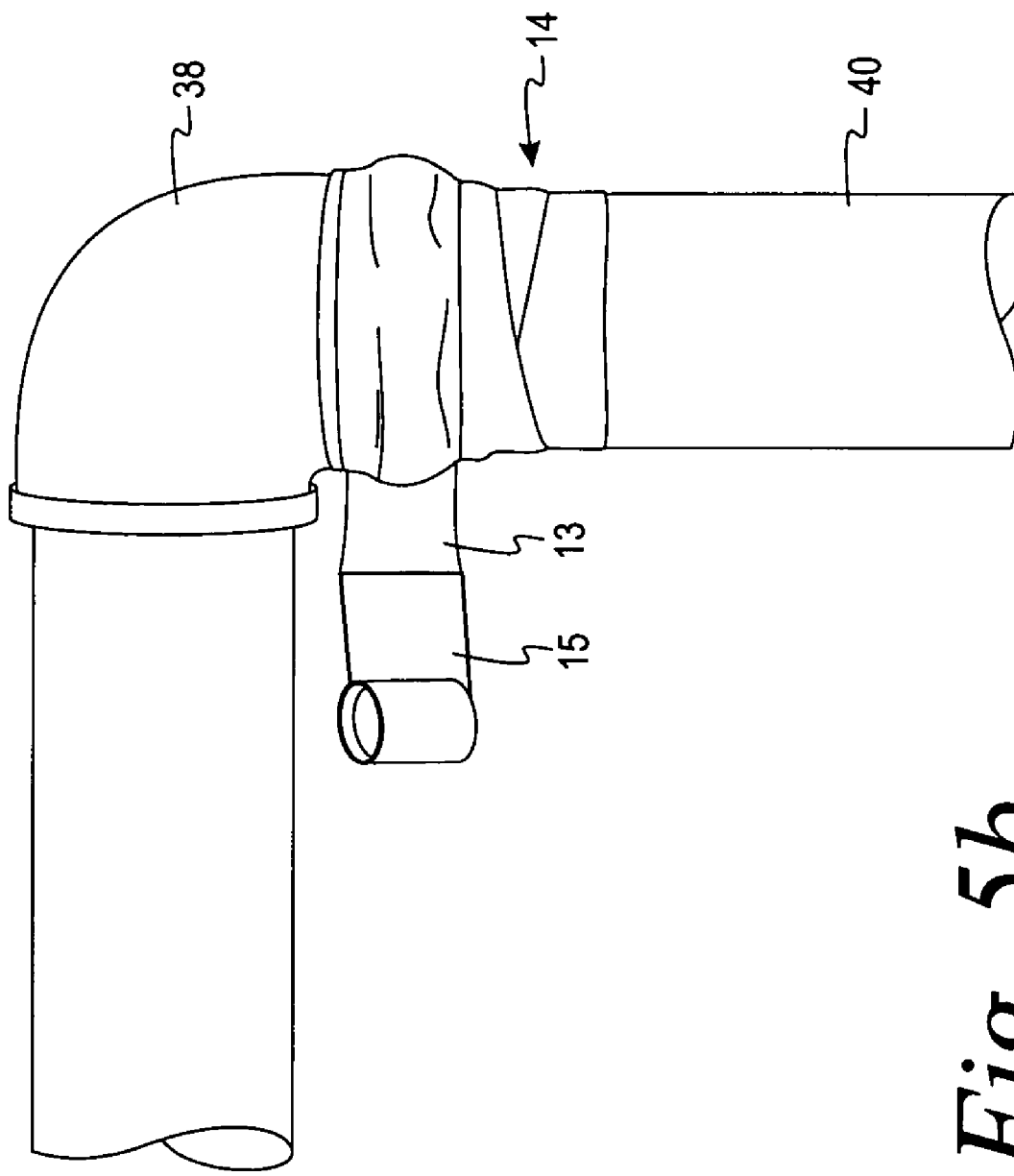
FIG. 5b illustrates the application of the pressure sealant to the joint leak.

After the leak sealant 12 has set (if needed), the pressure sealant 14 is applied. FIGS. 5a and 5b illustrate the application of the pressure sealant 14 to the pinhole leak 34 and the joint leak 36, respectively. If the pressure sealant 14 includes the protective paper 17 described above, then the protective paper 17 should be removed prior to application of the pressure sealant 14.

With respect to the pinhole leak 34, as illustrated in FIG. 5a, the application of the pressure sealant 14 should begin by wrapping the adhesive 16 to the pipe 32 adjacent to the leak sealant 12. This will help anchor the pressure sealant 14 to the pipe 32. After the rubber portion 13 appears, the pressure sealant 14 should then be wrapped around the leak sealant 12 and the pipe 32. Most of the pressure sealant 14 should be applied directly over the leak sealant 12. To apply maximum pressure, the pressure sealant 14 should simultaneously be stretched while wrapping. Wrapping the pressure sealant 14 tightly will help force the leak sealant 12 into the pinhole leak 34. The leak sealant 12 should be totally encased by the pressure sealant 14. The pressure sealant 14 should continue to be applied until the adhesive 15 on the first end portion of the pressure sealant 14 is fully attached to the repair.

Referring now to FIG. 5b, the pressure sealant 14 is applied to the joint leak 36 in much the same way as the pressure sealant 14 was applied to the pinhole leak 34. The adhesive 16 of the pressure sealant 14 is wrapped around the pipe 40. After the rubber portion 13 appears, the pressure sealant 14 should then be wrapped around the leak sealant 12, the pipe 40, and a portion of the elbow 38. It is preferable that the pressure sealant 14 is stretched during wrapping as described above in reference to the pinhole leak 34. Wrapping and stretching the pressure sealant 14 will help force the leak sealant 12 into the joint leak 36. The pressure sealant 14 should continue to be wrapped until the adhesive 15 is attached to the repair. The adhesive 15 will hold the pressure sealant 14 in place until the encapsulator 18 can be applied.

Once the pressure sealant 14 is secured, a standard leak detection procedure may be followed to ensure the gas is sealed and contained. The identification card 20 can also be filled out at this time and put aside for insertion into the final wraps of the encapsulator 18 as will be described below. It should be noted however, that the identification card 20 can be filled out at any point prior to its insertion into the encapsulator 18.

Figure 6C:
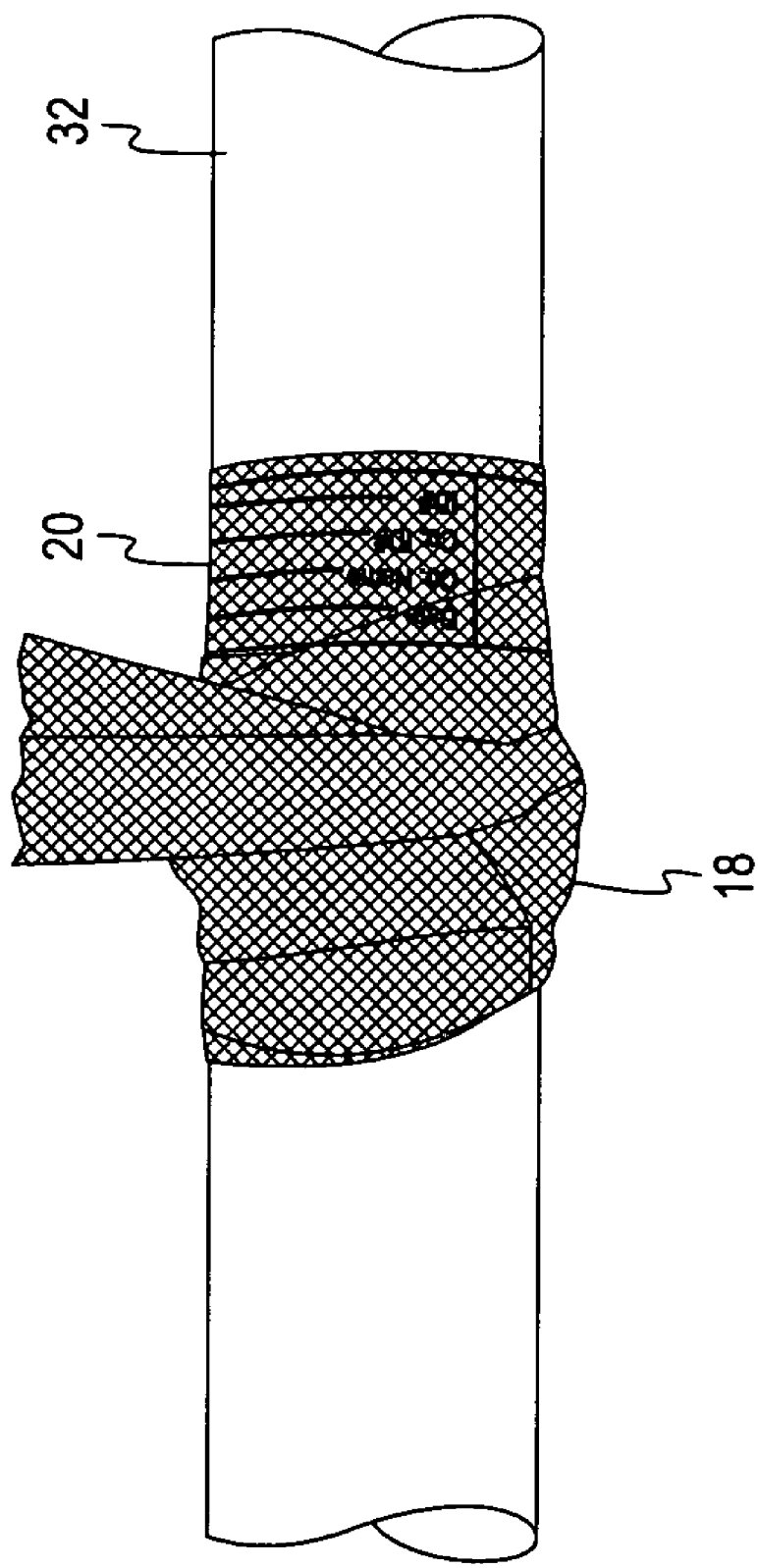
FIG. 6c illustrates an identification card contained within the encapsulator.

As mentioned above, moisture (e.g., water) is needed to activate the encapsulator 18. Since the material of the encapsulator 18 may be an irritant, a user may choose to use the supplied protective gloves 22 prior to the application of the encapsulator 18. After submerging the encapsulator 18 into water (approximately 10 seconds), the encapsulator 18 should initially be wrapped adjacent to the pressure sealant 14 as shown in FIG. 6a. The encapsulator 18 should then be wrapped firmly to extend over and cover the pressure sealant 14. As illustrated in FIG. 6b, the encapsulator 18 can be twisted while being wrapped which helps the encapsulator 18 to tightly conform to the surface of the pipe 32. Before the encapsulator 18 is completely applied, the identification card 20 may be placed on the encapsulator 18 surface. The remaining length of the encapsulator 18 should be wrapped over and cover the identification card 20 as shown in FIG. 6c. After the encapsulator 18 has been wrapped around the repair area, the encapsulator 18 may be squeezed and molded to tighten and conform the encapsulator 18 to the pipe 32. The squeezing and molding of the encapsulator 18 should be continued until the initial set (approximately 5 minutes).

Figure 6D:
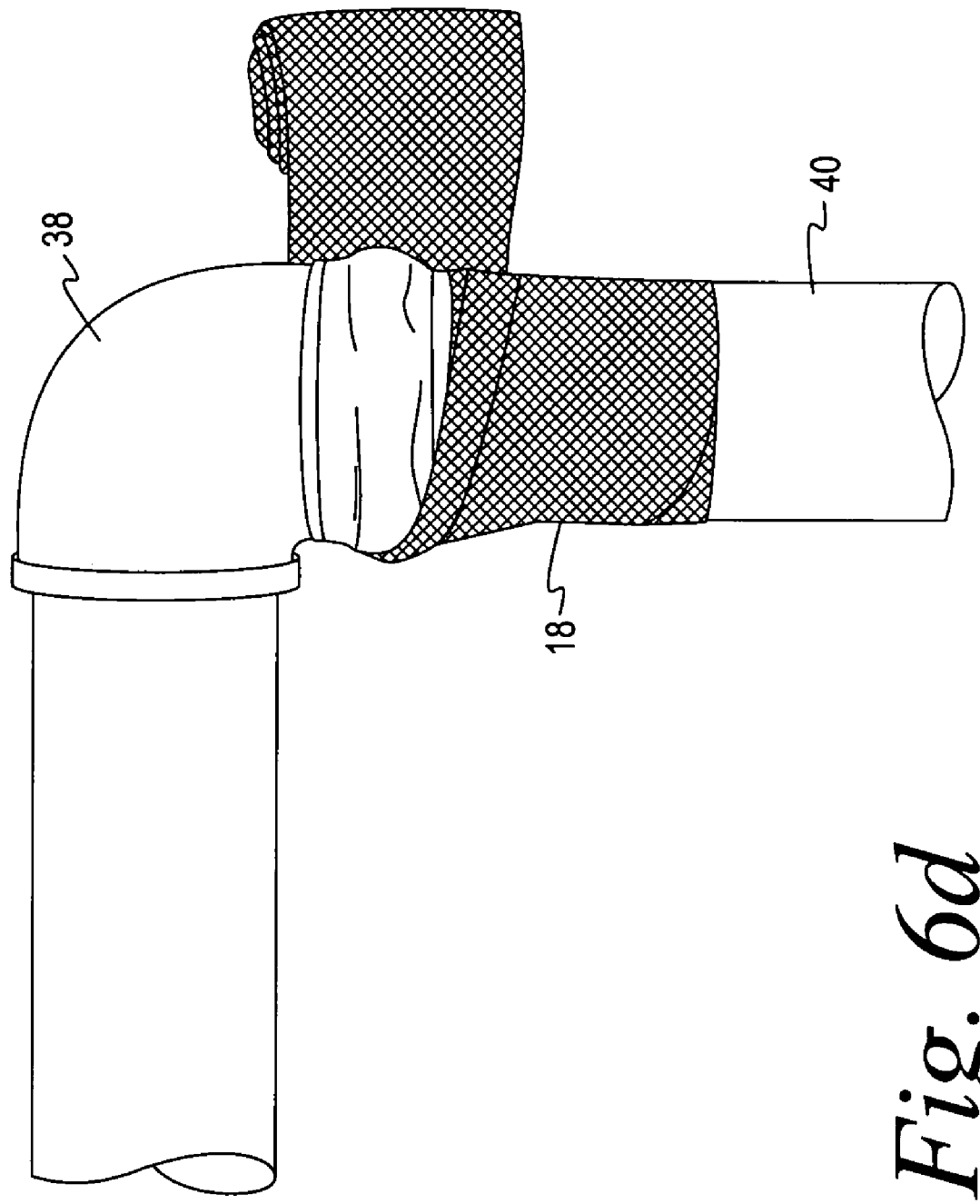
FIG. 6d illustrates the application of the encapsulator to the joint leak.

The encapsulator 18 is applied to the joint leak 36 in much the same way it is applied to the pinhole leak 34 as described above. Referring to FIG. 6d, the encapsulator 18 should be initially wrapped adjacent to the joint leak 36 on the pipe 40. The wrapping should continue in the direction towards the elbow 38 so that the encapsulator 18 conforms to the elbow 38. The encapsualtor 18 can be twisted while being applied in the same way as described above in reference to the application of the encapsulator 18 to the pinhole leak 34. Furthermore, the identification card 20 is also applied to the encapsulator 18 in much the same way as described above. The encapsulator 18 should also be squeezed and molded in the same manner as described above.

Another standard leak test can be performed to ensure the material has properly sealed the leak. If the encapsulator 18 is in the form of the Trident-Seal™ Glass Outer Wrap, the standard leak test should not be performed within approximately 5 minutes of the application of the encapsulator 18. Furthermore, if leak detection soap is used, the encapsulator 18 should be fully cured (approximately 30 minutes) before testing. Once the encapsulator 18 has been cured (30 minutes at 75° F. for the Trident-Seal™ Glass Outer Wrap), it can be painted.

While the present invention has been described with reference to one or more particular embodiments, those skilled in the art will recognize that many changes may be made thereto without departing from the spirit and scope of the present invention. For example, instead of performing the leak detection procedures at the above indicated times, the pinhole leak 34 and joint leak 36 may be detected at any time during the repair. Each of these embodiments and obvious variations thereof is contemplated as falling within the spirit and scope of the claimed invention, which is set forth in the following claims.

What is claimed is:

1. A natural gas repair kit adapted to repair a gas leak in a pipe containing natural gas, the gas repair kit comprising:
   a deformable leak sealant comprising a quick-curing epoxy material, the leak sealant adapted to cover the leak in the natural gas pipe;
   a pressure sealant including an ethylene propylene rubber material, the pressure sealant adapted to surround and contact the leak sealant, the pressure sealant causing the leak sealant to conform to the leak; and
   an encapsulator adapted to surround the leak sealant and the pressure sealant, the encapsulator contacting the pressure sealant and a portion of the natural gas pipe adjacent to the leak.

2. The gas repair kit of claim 1, wherein the deformable leak sealant is a putty, and the epoxy material that comprises the leak sealant is glycidyl ether of bisphenol A resins and tri (dimethylaminomethyl) phenol.

3. The gas repair kit of claim 1, wherein the pressure sealant is a tape that includes an ethylene-propylene-50-ethylideneorbormene polymer.

4. The gas repair kit of claim 1, wherein the encapsulator is an activatable polyurethane pre-impregnated wrap.

5. The gas repair kit of claim 4, wherein the encapsulator is activated by aqueous moisture.

6. The gas repair kit of claim 1, further comprising an identification tag located generally within the encapsulator, the identification tag being adapted to receive information relating to the pipe.

7. The gas repair kit of claim 1, further comprising a pipe cleaning and roughening material.

8. A method for repairing a gas leak in a pipe containing natural gas without stopping the flow of the natural gas within the pipe, the method comprising the acts of:
   applying a deformable epoxy-based leak sealant over the leak in the pipe while the pipe is operating at a pressure exceeding 2 pounds per square inch;
   wrapping a pressure sealant that includes an ethylene propylene rubber material around the pipe near the leak, the wrapping causing the deformable leak sealant to at least partially conform to the shape of the leak; and
   wrapping an encapsulator around the pipe near the leak, the encapsulator contacting the pressure sealant and the pipe.

9. The method of claim 8, wherein the method further comprises testing the gas leak with a natural gas detection device to ensure that no natural gas is being released.

10. The method of claim 8, wherein the pressure sealant is a tape that includes an ethylene-propylene-50-ethylideneorbormene polymer.

11. The method of claim 8, wherein the encapsulator is an activatable polyurethane pre-impregnated wrap.

12. The method of claim 11, wherein the encapsulator is activated by aqueous moisture, and the method further comprises allowing the activated encapsulator to harden after wrapping the activated encapsulator.

13. The method of claim 8, the method further comprising the act of placing an identification tag within the encapsulator during the wrapping of the encapsulator around the pipe, the identification tag containing information concerning the repair of the gas leak.

14. A method for repairing a gas leak in a pipe containing natural gas, the method comprising the acts of:
   locating the origin of the gas leak;

cleaning and roughening a surface of the pipe surrounding the gas leak;

placing a deformable leak sealant comprising a quick-curing epoxy material over the gas leak, the deformable leak sealant covering the leak;

before the deformable leak sealant has hardened, wrapping a pressure sealant comprising an ethylene propylene rubber material around the pipe near the leak, the pressure sealant causing the deformable leak sealant to conform to the leak;

testing the gas leak with a natural gas detection device to ensure that no natural gas is being released;

activating an encapsulator;

wrapping the encapsulator around the pipe and the pressure sealant near the leak;

placing an identification tag on the encapsulator, the identification tag containing information concerning the repair of the gas leak;

covering the identification tag with the encapsulator; and applying pressure to the encapsulator to conform to the pipe and the pressure sealant.

15. The method of claim 14, wherein the leak sealant is a putty.

16. The method of claim 14, wherein the encapsulator is activated by aqueous moisture, and the method further comprises allowing the activated encapsulator to harden after wrapping the activated encapsulator.

17. The method of claim 14, wherein the encapsulator hardens after applying the pressure.

18. The gas repair kit of claim 1, wherein the pipe has an operating pressure between approximately 2 psi and 20 psi.

19. The method of claim 8, further comprises wrapping the pressure sealant before the putty hardens, and wherein the deformable leak sealant is a putty comprising an epoxy material.

20. The method of claim 19, wherein the epoxy material comprises glycidyl ether of bisphenol A resins and tri (dimethylaminomethyl) phenol.

21. The kit of claim 1, wherein the quick-curing epoxy material has a mix time of up to approximately 3 minutes.

22. The method of claim 14, wherein the quick-curing epoxy material has a mix time of up to approximately 3 minutes.

* * * * *